United States Patent
Kao et al.

(10) Patent No.: US 8,614,426 B1
(45) Date of Patent: Dec. 24, 2013

(54) LIGHT DISINFECTION DEVICE

(71) Applicant: National Yang Ming Unviersity, Taipei (TW)

(72) Inventors: Fu-Jen Kao, Taipei (TW); Wei R. Chen, Edmond, OK (US); Shin-Shian Lee, Taipei (TW)

(73) Assignee: National Yang Ming University, Taipei (TW)

( * ) Notice: Subject to any disclaimer, the term of this patent is extended or adjusted under 35 U.S.C. 154(b) by 0 days.

(21) Appl. No.: 13/735,537

(22) Filed: Jan. 7, 2013

(30) Foreign Application Priority Data

Nov. 19, 2012 (TW) .............................. 101143057 A

(51) Int. Cl.
*G01N 23/00* (2006.01)
*H01J 37/20* (2006.01)

(52) U.S. Cl.
USPC ....... 250/455.11; 250/431; 250/435; 250/436

(58) Field of Classification Search
USPC .............................. 250/455.11, 431, 435, 436
See application file for complete search history.

(56) References Cited

U.S. PATENT DOCUMENTS

| | | | | |
|---|---|---|---|---|
| 4,740,706 A | * | 4/1988 | Murdock, III | 250/455.11 |
| 2012/0251973 A1 | * | 10/2012 | Gramann et al. | 433/29 |

* cited by examiner

*Primary Examiner* — Jack Berman
*Assistant Examiner* — Meenakshi Sahu
(74) *Attorney, Agent, or Firm* — Muncy, Geissler, Olds & Lowe, PLLC

(57) ABSTRACT

The present invention discloses a light disinfection device, and the disinfection device at least comprises a disinfection light tube, a controlling body, a circular reflector and a stowage platform. The disinfection light tube is a light source with a circular shape. The controlling body electrically connects with and controls the disinfection light tube. The circular reflector is disposed along the outer side of the disinfection light tube to cover part of light emitted from the disinfection light tube. The stowage platform connects with the controlling body via a rotatable shaft and comprises a transparent plate disposed at the end of the rotatable shaft. Furthermore, the stowage platform extends to the inner side of the disinfection light tube and rotates by the control of the controlling body to let the disinfection light tube irradiate an object on the stowage platform. The disinfection device disclosed in the present invention can disinfect the object by full angular (4π solid angle) irradiation, and the device structure is simple that can be disassembled into parts, including disinfection light tube, the circular reflector and the stowage platform from the controlling body. The configuration is to facilitate portability and convenience for users.

11 Claims, 1 Drawing Sheet

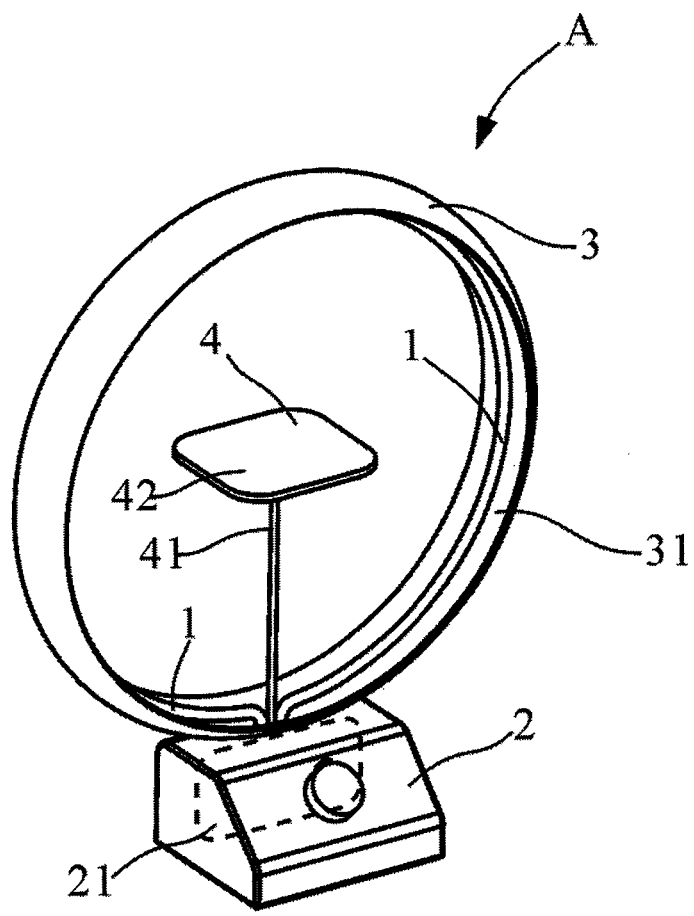

LIGHT DISINFECTION DEVICE

CROSS-REFERENCE TO RELATED APPLICATIONS

This Non-provisional application claims priority under 35 U.S.C. §119(a) on Patent Application No(s). TW101143057 filed in Taiwan, Republic of China, 11, 19, 2012, the entire contents of which are hereby incorporated by reference.

FIELD OF THE INVENTION

This invention relates to a light disinfection device, especially relates to a light disinfection device for adequately eliminating bacteria of food, books, clothes, and small articles of daily use in full angular ($4\pi$ solid angle) setting.

BACKGROUND OF THE INVENTION

The prior disinfection devices almost have the similar design such as a housing or a chamber. An object, to be disinfected, needs to be placed inside the housing or the chamber for disinfecting. However, the disinfection housing or chamber is often bulky so that the use of the prior disinfection device is limited by the requirement on space and not portable for more flexible arrangement.

Besides, the irradiation of the prior disinfection device has a fixed direction and cannot cover a full angular irradiation. Although there are some light sources designed with a rotatable or movable joint, the adjustable angle and direction of the joint is still limited. Therefore, the irradiation direction of the prior disinfection device cannot be easily adjusted to a suitable position according to users' need and has several disadvantages to be overcome.

SUMMARY OF THE INVENTION

According to the abovementioned disadvantages of the prior art, such as bulkiness and limited direction of the irradiation, the prior light disinfection device cannot proceed a full angular ($4\pi$ solid angle) disinfection.

Therefore, the present invention provides a light disinfection device, and the disinfection device at least comprises a disinfection light tube, a controlling body, a circular reflector and a stowage platform. The disinfection light tube is a light source with a circular shape. The controlling body electrically connects with and controls the disinfection light tube. The circular reflector is disposed along the outer side of the disinfection light tube to cover part of light emitted from the disinfection light tube. The stowage platform connects with the controlling body via a rotatable shaft and comprises a transparent plate disposed at the end of the rotatable shaft. Furthermore, the stowage platform extends to the inner side of the disinfection light tube and rotates by the control of the controlling body to let the disinfection light tube irradiate an object on the stowage platform.

The disinfection device disclosed in the present invention can disinfects the object by full angular ($4\pi$ solid angle) irradiating, and the device structure is simple that can separate the disinfection light tube, the circular reflector and the stowage platform from the controlling body, it is convenient for user to use and assemble the various parts.

As the abovementioned, the present invention has been completed according to a plurality of researches for resolving the above disadvantages.

BRIEF DESCRIPTION OF THE DRAWINGS

FIG. 1 is the schematic showing a stereo projection according to a preferred embodiment of the present invention.

DETAILED DESCRIPTION OF THE INVENTION

The features and advantages of the present invention will be understood and illustrated in the following specification and FIGURE.

Please refer to a preferred embodiment of the present invention as shown in FIG. 1, a light disinfection device A is disclosed in the present invention and comprises a disinfection light tube 1, a controlling body 2, a circular reflector 3 and a stowage platform 4. The disinfection light tube 1 is a light source with a circular shape. The controlling body 2 electrically connects with and controls the disinfection light tube 1. The circular reflector 3 is disposed along the outer side of the disinfection light tube 1 to cover part of light emitted from the disinfection light tube 1. The stowage platform 4 connects with the controlling body 2 via a rotatable shaft 41 and comprises a transparent plate 42 disposed at the end of the rotatable shaft 41. Furthermore, the stowage platform 4 extends to the inner side of the disinfection light tube 1 and rotates by the control of the controlling body 2 to let the disinfection light tube 1 irradiate an object (not shown in the FIGURE) on the stowage platform 4.

Preferably, the disinfection light tube 1 can be selected from a group consisting of a UV light tube, a nano-photocatalyst light tube and other light tubes capable of disinfecting.

Preferably, the disinfection light tube 1 can be a UV cold cathode fluorescent light (UV-CCFL) tube.

Preferably, there is a reflecting surface 31 disposed on the inner side of the circular reflector 3, and the reflecting surface 31 can reflect the light emitted from the disinfection light tube 1 to further adequately irradiate the object on the stowage platform 4. That is, the circular reflector 3 has a circular shape and uses a semi-open structure; therefore, the scattered light can be reflected to the inner side of the disinfection light tube 1 through the circular reflector 3 for efficiently utilizing the light emitted from the disinfection light tube 1 and decreasing the possibility of irradiative harm caused by the light.

Preferably, the controlling body 2 further comprises a motor 21 to drive the rotation of the stowage platform 4. That is, the stowage platform 4 can be rotated with a uniform motion by driving the rotating shaft 41, or the rotating speed of the rotating shaft 41 can be controlled by a knob or a controlling button.

Preferably, the light emitted from the disinfection light tube 1 can penetrate the transparent plate 42 to let each aspect of the object be irradiated. That is, the present invention prevents any aspect of the object on the stowage platform 4 from being not irradiated. In the preferred embodiment, the transparent plate 42 is a transparent material and composed of quartz. Its construction can be wire-framed to allow maximum transmission of irradiation light.

Preferably, the light emitted from the disinfection light tube 1 can penetrate the rotating shaft 41 to let each aspect of the object be irradiated. In the preferred embodiment, the rotating shaft 41 is a transparent material and composed of quartz.

Although the present invention has been described in terms of specific exemplary embodiments and examples, it will be understood that the embodiments disclosed herein are for illustrative purposes only and various modifications and alterations might be made by those skilled in the art without departing from the spirit and scope of the invention as set forth in the following claims.

We claim:

1. A light disinfection device, at least comprising:
   a disinfection light tube being a light source with a circular shape;
   a controlling body electrically connecting with and controlling the disinfection light tube;
   a circular reflector being disposed along the outer side of the disinfection light tube to cover part of light emitted from the disinfection light tube; and
   a stowage platform connecting with the controlling body via a rotatable shaft and comprising a transparent plate disposed at the end of the rotatable shaft,
   wherein the stowage platform extends to the inner side of the disinfection light tube and rotates by the control of the controlling body to let the disinfection light tube irradiate an object on the stowage platform.

2. The light disinfection device according to claim 1, wherein the disinfection light tube can be selected from a group consisting of a UV light tube, a nano-photocatalyst light tube and other light tubes capable of disinfecting.

3. The light disinfection device according to claim 1, wherein the disinfection light tube is a UV cold cathode fluorescent light tube.

4. The light disinfection device according to claim 1, wherein the inner side of the circular reflector comprises a reflecting surface and the reflecting surface can reflect the light emitted from the disinfection light tube to further adequately irradiate the object on the stowage platform.

5. The light disinfection device according to claim 1, wherein the controlling body further comprises a motor to drive the rotation of the stowage platform.

6. The light disinfection device according to claim 1, wherein the light emitted from the disinfection light tube can penetrate the transparent plate to let each aspect of the object be irradiated.

7. The light disinfection device according to claim 6, wherein the transparent plate is a transparent material.

8. The light disinfection device according to claim 6, wherein the transparent plate is composed of quartz.

9. The light disinfection device according to claim 1, wherein the light emitted from the disinfection light tube can penetrate the rotating shaft to let each aspect of the object be irradiated.

10. The light disinfection device according to claim 9, wherein the rotating shaft is a transparent material.

11. The light disinfection device according to claim 9, wherein the rotating shaft is composed of quartz.

* * * * *